(12) United States Patent
Archer et al.

(10) Patent No.: US 9,397,366 B2
(45) Date of Patent: Jul. 19, 2016

(54) IONIC-LIQUID NANOSCALE IONIC MATERIAL (IL-NIM) COMPOSITIONS, METHODS AND APPLICATIONS

(75) Inventors: Lynden A. Archer, Ithaca, NY (US); Surya S. Moganty, Henrietta, NY (US); Yingying Lu, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 77 days.

(21) Appl. No.: 14/131,755

(22) PCT Filed: Jul. 10, 2012

(86) PCT No.: PCT/US2012/046020
§ 371 (c)(1),
(2), (4) Date: Jan. 9, 2014

(87) PCT Pub. No.: WO2013/009731
PCT Pub. Date: Jan. 17, 2013

(65) Prior Publication Data
US 2014/0154588 A1    Jun. 5, 2014

Related U.S. Application Data

(60) Provisional application No. 61/657,252, filed on Jun. 8, 2012, provisional application No. 61/506,226, filed on Jul. 11, 2011.

(51) Int. Cl.
*H01M 10/056* (2010.01)
*H01M 10/052* (2010.01)
(Continued)

(52) U.S. Cl.
CPC .......... *H01M 10/056* (2013.01); *H01M 10/052* (2013.01); *H01M 10/0567* (2013.01); *H01M 10/0568* (2013.01); *H01M 10/0569* (2013.01);
(Continued)

(58) Field of Classification Search
CPC .......... H01M 10/056; H01M 10/0569; H01M 10/052; H01M 10/0567; H01M 10/0568; H01M 2300/0045; Y02E 60/122; B82Y 30/00
See application file for complete search history.

(56) References Cited

U.S. PATENT DOCUMENTS 6,969,693 B2    11/2005   Sauvage et al.
7,094,441 B2    8/2006    Chittibabu et al.
(Continued)

FOREIGN PATENT DOCUMENTS

EP    1598896 A1    11/2005
JP    2003257476 A   9/2003
(Continued)

OTHER PUBLICATIONS

Mogantry et al. Angew. Chem. Int. Ed. 2010 vol. 49 pp. 9158-9161.*
Yuan, Jiayin and Antonietti, Markus, 2011, "Poly(ionic liquid)s: Polymers expanding classical property profiles", Polymer 52, pp. 1469-1482.
(Continued)

*Primary Examiner* — Patrick Ryan
*Assistant Examiner* — Aaron Greso
(74) *Attorney, Agent, or Firm* — William Greener; Alek P. Szecsy; Bond, Schoeneck & King, PLLC

(57) ABSTRACT

A method for preparing an ionic liquid nanoscale ionic material, the ionic liquid nanoscale ionic material and a battery that includes a battery electrolyte that comprises the ionic liquid nanoscale ionic material each provide superior performance. The superior performance may be manifested within the context of inhibited lithium dendrite formation.

34 Claims, 18 Drawing Sheets

(51) Int. Cl.
H01M 10/0567 (2010.01)
H01M 10/0568 (2010.01)
H01M 10/0569 (2010.01)
B82Y 30/00 (2011.01)

(52) U.S. Cl.
CPC ........ B82Y 30/00 (2013.01); H01M 2300/0045 (2013.01); Y02E 60/122 (2013.01); Y02P 70/54 (2015.11)

(56) References Cited

U.S. PATENT DOCUMENTS

| | | | |
|---|---|---|---|
| 7,833,643 | B2 | 11/2010 | Angell et al. |
| 2004/0258608 | A1* | 12/2004 | Cayton et al. ............... 423/592.1 |
| 2005/0033102 | A1 | 2/2005 | Randolph et al. |
| 2009/0203820 | A1 | 8/2009 | Sawada et al. |
| 2010/0239918 | A1 | 9/2010 | Pratt et al. |
| 2011/0056563 | A1 | 3/2011 | Bari |
| 2011/0183205 | A1 | 7/2011 | Graczyk et al. |
| 2011/0233458 | A1 | 9/2011 | Texter |
| 2011/0236295 | A1 | 9/2011 | Anderson et al. |
| 2012/0039824 | A1 | 2/2012 | Archer et al. |
| 2012/0082903 | A1 | 4/2012 | Zhang et al. |
| 2012/0101184 | A1 | 4/2012 | Kang et al. |

FOREIGN PATENT DOCUMENTS

| | | |
|---|---|---|
| JP | 2011113906 A | 6/2011 |
| WO | 2007123356 | 11/2007 |
| WO | 2009050042 | 4/2009 |

OTHER PUBLICATIONS

Lu, Jianmei et al., 2009, "Advanced applications of ionic liquids in polymer science", Progress in Polymer Science 34 (2009) pp. 431-448.

Litschauer, Marco and Neouze, Marie-Alexandra, 2008, "Nanoparticles connected through an ionic liquid-like network", Journal of Materials Chemistry, pp. 640-646.

Litschauer, Marco et al., 2010, "Anion metathesis in ionic silica nanoparticle networks", Journal of Materials Chemistry, pp. 1269-1276.

Valkenberg, M. H. et al., 2002, "Immobilisation of ionic liquids on solid supports", Green Chemistry, pp. 88-93.

Sang-gi, Lee, 2006, "Functionalized imidazolium salts for task-specific ionic liquids and their applications", The Royal Society of Chemistry, pp. 1049-1063.

Mehnert, Christian P., et al., 2002, "Supported Ionic Liquid Catalysis—A New Concept for Homogeneous Hydroformylation Catalysis", J. Am. Chem. Soc. pp. 12932-12933.

Burguete et al., 2009, "Development of Efficient Processes Under Flow Conditions Based on Catalysts Immobilized Onto Monolithic Supported Ionic Liquid-Like Phases", Copyright 2009 Gale, Cengage Learning, http://www.freepatentsonline.com/article/Pure-Applied-Chemistry/213084299.html.

Moganty, Surya S., et al., 2010, "Ionic-Liquid-Tethered Nanoparticles: Hybrid Electrolytes," Angew. Chem. Int. Ed. 2010, 49, 9158-916.

Gruttadauria et al., Supported Ionic Liquid Asymmetric Catalysis. A New Method for Chiral Catalysts Recycling. The Case of Proline-Catalyzed Aldol Reaction, Tetrahedron Letters 45 (2004) 6113-6116.

* cited by examiner

IONIC-LIQUID NANOSCALE IONIC MATERIAL (IL-NIM) COMPOSITIONS, METHODS AND APPLICATIONS

CROSS-REFERENCE TO RELATED APPLICATIONS

This application is related to, and derives priority from: (1) U.S. Provisional Patent Application Ser. No. 61/506,226, filed 11 Jul. 2011, and titled Ionic Liquid Tethered Nanoparticle Hybrid Electrolytes; and (2) U.S. Provisional Patent Application Ser. No. 61/657,252, filed 8 Jun. 2012, and also titled Ionic liquid Tethered Nanoparticle Hybrid Electrolytes, the content of both of which applications is incorporated herein fully by reference.

STATEMENT OF GOVERNMENT INTEREST

The research that lead to the embodiments as disclosed herein and the invention as claimed herein was funded by the United States National Science Foundation under grant number DMR-0079992. The United States Government has rights in the invention claimed herein.

BACKGROUND

1. Field of the Invention

Embodiments relate generally to ionic-liquid nanoscale ionic material (IL-NIM) compositions. More particularly, embodiments relate to ionic-liquid nanoscale ionic material electrolyte compositions.

2. Description of the Related Art

Secondary batteries containing lithium (Li) metal as an anode are attractive since they provide one of the highest known energy densities for electrical energy storage. Unfortunately, however, most currently used electrolytes are unsuitable for use with a lithium metal anode because they are unstable at typical cell potentials. Moreover such electrolytes also do not mitigate lithium dendrite growth during repeated battery charge and discharge cycles. Such lithium dendrite growth is undesirable within lithium secondary batteries since such lithium dendrite growth may lead to shorting within a secondary lithium battery.

Given the significance of lithium batteries in various applications, desirable are electrolytes for lithium batteries that are stable, provide superior performance and mitigate lithium dendrite growth.

SUMMARY

Embodiments include: (1) a method for preparing an ionic-liquid nanoscale ionic material (IL-NIM); (2) an IL-NIM; (3) a battery electrolyte composition that includes an IL-NIM; and (4) a battery that includes the battery electrolyte composition that includes the IL-NIM.

The method for preparing the IL-NIM includes forming a metal oxide nanoparticle in-situ in solution via reaction of a metal oxide precursor material, and subsequently reacting in-situ in solution the metal oxide nanoparticle with an ionic-liquid functional coupling agent to prepare the IL-NIM absent cross-linking (i.e., the ionic-liquid is bonded and tethered to a single metal oxide nanoparticle). This particular process sequence avoids agglomeration of the metal oxide nanoparticle when preparing the ionic-liquid nanoscale ionic material in accordance with the embodiments.

The IL-NIM includes an ionic-liquid that includes at least one of a nitrogen cation moiety, a phosphorus cation moiety and a sulfur cation moiety, and also a counter anion, where the at least one of the nitrogen cation moiety, the phosphorus cation moiety and the sulfur cation moiety is tethered to a single nanoparticle.

The battery electrolyte includes an IL-NIM that includes at least one of a nitrogen cation moiety, a phosphorus cation moiety and a sulfur cation moiety, and also a counter anion, where the at least one of the nitrogen cation moiety, the phosphorus cation moiety and the sulfur cation moiety is tethered to at least one nanoparticle. The battery electrolyte also includes a lithium salt. The lithium salt may include the same counter anion as the IL-NIM, but such is not a requirement of the embodiments.

The battery includes the foregoing battery electrolyte.

The battery electrolyte composition in accordance with the embodiments provides superior performance of a battery which utilizes the battery electrolyte composition insofar as the battery electrolyte composition in accordance with the embodiments may mitigate lithium dendrite growth.

A particular method for preparing a material composition in accordance with the embodiments includes preparing in-situ in solution a plurality of metal oxide nanoparticles by reaction of a metal oxide precursor material. This particular method also includes reacting in-situ in solution the plurality of metal oxide nanoparticles with an ionic-liquid functionalized coupling agent material to provide a nanoparticle tethered ionic-liquid nanoscale ionic material absent cross-linking.

A particular material composition in accordance with the embodiments includes a plurality of nanoparticles. The particular material composition also includes a plurality of ionic liquid molecules each comprising: (1) at least one of a nitrogen cation moiety, a phosphorus cation moiety and a sulfur cation moiety; and (2) a counter anion, each nitrogen cation moiety, phosphorus cation moiety or sulfur cation moiety being tethered to a single nanoparticle.

Another particular material composition in accordance with the embodiments includes a plurality of nanoparticles. This other particular material composition also includes a plurality of ionic liquid molecules each comprising: (1) at least one of a nitrogen cation moiety, a phosphorus cation moiety and a sulfur cation moiety; and (2) a counter anion, each nitrogen cation moiety, phosphorus cation moiety or sulfur cation moiety being tethered to at least one nanoparticle. This other particular material composition also includes a lithium salt.

A particular battery in accordance with the embodiments includes an electrolyte comprising a material composition comprising: (1) a plurality of nanoparticles; and (2) a plurality of ionic liquid molecules each comprising: (a) at least one of a nitrogen cation moiety, a phosphorus cation moiety and a sulfur cation moiety; and (b) a counter anion, each nitrogen cation moiety, phosphorus cation moiety or sulfur cation moiety being tethered to at least one nanoparticle.

BRIEF DESCRIPTION OF THE DRAWINGS

The objects, features and advantages of the embodiments are understood within the context of the Detailed Description of the Embodiments, as set forth below. The Detailed Description of the Embodiments is understood within the context of the accompanying drawings, that form a material part of this disclosure, wherein.

DETAILED DESCRIPTION OF THE EMBODIMENTS

Figure 1A:
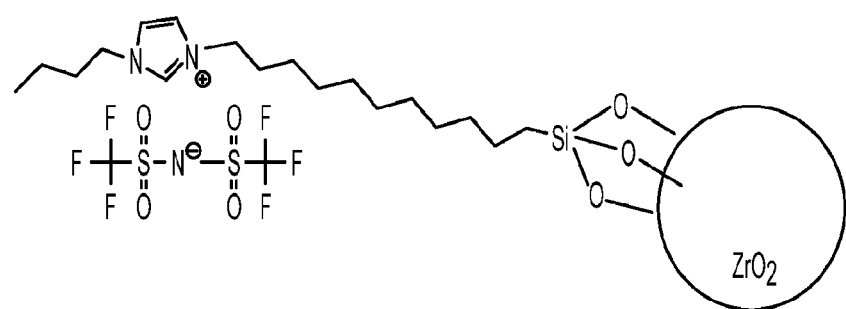
FIG. 1A shows a chemical structure of an ionic-liquid nanoscale ionic material (IL-NIM) in accordance with a first embodiment.

The embodiments provide a method for preparing an IL-NIM that may be used in a battery electrolyte composition for use within a lithium battery such as but not limited to a lithium metal battery or a lithium ion battery, as well as the IL-NIM and a battery that includes the IL-NIM in the battery electrolyte composition. The battery electrolyte composition in accordance with the embodiments comprises an ionic-liquid nanoscale ionic material (IL-NIM) that comprises: (1) a metal oxide nanoparticle; (2) at least one of a nitrogen cation moiety, a phosphorus cation moiety and a sulfur cation moiety tethered to the metal oxide nanoparticle; and (3) a counter anion associated with the at least one of the nitrogen cation moiety, the phosphorus cation moiety and the sulfur cation moiety and charge balancing the at least one of the nitrogen cation moiety, the phosphorus cation moiety and the sulfur cation moiety. The battery electrolyte composition also includes a lithium salt, typically but not necessarily that includes a counter anion that is the same as the IL-NIM.

I. General Method and Materials Considerations for the Ionic-Liquid Nanoscale Ionic Material (IL-NIM) and the Battery Electrolyte Composition in Accordance with the Embodiments The embodiments provide a family of solventless electrolytes created by tethering ILs to hard inorganic $ZrO_2$ nanostructures which may generally be considered as nanoparticles (as well as other insulating inorganic metal oxide nanostructures which may also be considered as nanoparticles), as illustrated within the context of the chemical structure of FIG. 1A. Termed ionic-liquid nanoscale ionic materials (IL-NIMs), these fluids exhibit exceptional redox stability windows, excellent thermal stability, good Li transference numbers, long-term interfacial stability in the presence of a lithium anode, and when doped with a lithium bis(trifluoromethylsulfonyl)imide (LiTFSI) salt (or other lithium salt preferably including a comparatively bulky anion), reasonable ionic conductivities. Additionally, mechanical characterization measurements indicate that the shear modulus of these IL-NIMs are many orders of magnitude larger than their non-tethered ionic liquid precursors. These same measurements show that IL-NIM electrolytes belong to a class of yield stress materials termed soft glasses, in which each nanoscale organic-inorganic hybrid building block is trapped in a potential energy well many times deeper than the mean thermal energy, kT. Thus, when viewed from the vantage point of a diffusing Li ion or moving Li dendrite front, IL-NIM battery electrolytes are analogous to porous solids with tunable pore chemistry, dimensions, tortuosities, and surface chemistry (e.g. by changing the core particle and/or the IL ligand chemistry, size, and grafting density). By taking advantage of the already large libraries of available nanoparticle and ionic liquid chemistries, IL-NIMs open up a new vista for engineering novel hybrid battery electrolytes with exceptional electrochemical, mechanical, and thermal stability, for applications in secondary lithium metal and lithium ion batteries.

As noted above, and as illustrated in FIG. 1A, an IL-NIM in accordance with the embodiments comprises: (1) a nanoparticle; and (2) an ionic liquid molecule comprising: (a) at least one of a nitrogen cation moiety, a phosphorus cation moiety and a sulfur cation moiety tethered to the nanoparticle; and (b) a counter anion associated with the at least one of the nitrogen cation moiety, the phosphorus cation moiety and the sulfur cation moiety and charge balancing the at least one of the nitrogen cation moiety, the phosphorus cation moiety and the sulfur cation moiety. Although FIG. 1A illustrates a single ionic liquid molecule including a nitrogen cation moiety tethered to a single nanoparticle through a condensed alkoxysilane linkage, and while the embodiments contemplate that a particular cation moiety within each ionic liquid molecule is tethered to only a single nanoparticle within the method for preparing an IL-NIM composition and the IL-NIM composition to avoid crosslinking of nanoparticles through a multifunctional ionic liquid, the embodiments intend that each nanoparticle may have tethered thereto more than one cation moiety within more than one ionic liquid molecule and generally from about 10 to about 1000 cation moieties within about 10 to about 1000 ionic liquid molecules, and more preferably from about 50 to about 500 cation moieties within about 50 to about 500 ionic liquid molecules.

In addition, while the embodiments describe a battery electrolyte and a resulting battery that includes the IL-NIM that includes an ionic liquid tethered to only a single nanoparticle to avoid nanoparticle cross-linking, a battery electrolyte and a resulting battery in accordance with the embodiments may also contemplate that a cation moiety within an IL-NIM is bonded to at least one nanoparticle.

With respect to the nanoparticle, the nanoparticle may comprise a dielectric nanoparticle material and in particular a metal oxide dielectric nanoparticle material. Particular examples of metal oxide dielectric nanoparticle materials that may be used for fabricating a nanoparticle in accordance with the embodiments include, but are not limited to silica, alumina, ceria, titania, vanadia, and zirconia dielectric metal oxide materials. The embodiments also contemplate nanoparticles that comprise mixed metal oxide dielectric metal oxide nanoparticle materials. Typically and preferably, the nanoparticle in accordance with the embodiments has a size range from about 2 to about 1000 nanometers, and more preferably from about 10 to about 50 nanometers.

With respect to the nitrogen cation moiety within the ionic liquid material, the nitrogen cation moiety may comprise a nitrogen cation selected from the group including but not limited to an imidazolium, ammonium, pyridinium, piperdinium and pyrrolidinium nitrogen cation moieties. The embodiments also contemplate that phosphorus containing cation moieties such as but not limited to phosphonium cation moieties (and related nitrogen correlating phosphorus cation moieties) and sulfur containing cation moieties such as but not limited to sulfonium cation moieties (and related nitrogen correlating sulfur cation moieties), may also be tethered within the context of ionic liquids in accordance with the embodiments.

Such nitrogen cation moieties, phosphorus cation moieties and sulfur cation moieties may be tethered with respect to the nanoparticle of the embodiments by means of an organic chemical chain from about 2 to about 20 carbon atoms, including but not limited to alkyl organic chemical chains, alkenyl organic chemical chains or alkynl organic chemical chains. Other types and compositions for tethering of a nanoparticle are not precluded within the embodiments. The tethering of the nitrogen cation moieties, the phosphorus cation moieties or the sulfur cation moieties with respect to the nanoparticle may be effected using chemical bonding including but not limited to covalent bonding and ionic bonding, although covalent bonding using an ionic liquid functional alkoxysilane coupling agent is particularly common.

With respect to the counter anion that charge balances the at least one of the nitrogen cation moiety, the phosphorus cation moiety and the sulfur cation moiety, the counter anion may be selected from the group including but not limited to tetrafluoroborate ($BF_4$), hexafluorophosphate ($PF_6$), bis(trifluoromethylsulfonyl)imide (TFSI), trifluoromethane sulfonate, trifluoroacetate, acetate, nitrate, chloride, bromide, iodide, bis(pentafluoroethylsulfonyl)imide, dicynamide, hexafluoroarsenate ($AsF_6$), hexafluoroantimonate ($SbF_6$) and tetrachloroaluminate ($AlCl_4$) counter anions.

As will be disclosed in greater detail below, the embodiments contemplate the use of an IL-NIM in accordance with the embodiments, in conjunction with a lithium salt, as an electrolyte material within a battery, and in particular within a lithium battery such as but not limited to a lithium metal battery or a lithium ion battery. The lithium salt may include the same or different anion as the IL-NIM. Typically, the battery electrolyte includes the IL-NIM and the lithium salt in an IL-NIM:lithium salt weight ratio from about 10:1 to about 1:10, and more preferably from about 5:1 to about 1:1.

As will be discussed in further detail below the embodiments also contemplate use of a "host" material that provides particular desirable characteristics of materials compositions in accordance with the embodiments. Within the context of the embodiments, such "host" materials may include, but are not necessarily limited to: (1) an ionic liquid material that is not tethered to any nanoparticle; (2) a solvent selected from the group including but not limited to carbonates, ethers, acetamides, acetontrile, symmetric sulfones, 1,3-dioxolanes, glymes, siloxanes and blends of the foregoing solvents; and (3) a polymer selected from the group including but not limited to polyethylene oxides, polypropylene oxides, polyacrylonitriles, polysiloxanes, polyimides, polyethers, sulfonated polyimides, perfluorinated polymers and blends of the foregoing polymers. Typically, the host material is present at an IL-NIM:host material weight ratio from about 1:900 to about 900:1 and more preferably from about 1:10 to about 40:1.

When preparing an IL-NIM in accordance with the embodiments, and in order to avoid agglomeration of nanoparticles, a particular method for preparation of the IL-NIM provides for forming the nanoparticles in-situ in solution by hydrolysis, condensation or other suitable reaction of an appropriate nanoparticle metal oxide precursor material. Such a nanoparticle metal oxide precursor material may include, but is not necessarily limited to, tetraethylorthosilicate (TEOS) (i.e., for a nanoparticle comprising silica), zirconium chloride (i.e., for a nanoparticle comprising zirconia) or titanium chloride (i.e., for a nanoparticle comprising titania). Once the desirable nanoparticles have been prepared formed in-situ in solution, a particular ionic-liquid material may be tethered to a particular nanoparticle, and generally to a single nanoparticle, while using an appropriate ionic liquid functional coupling agent.

Figure 1B:
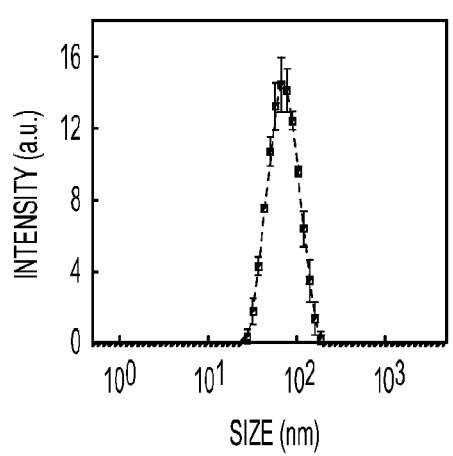
FIG. 1B shows a dynamic light scattering size distribution of the IL-NIM in accordance with the first embodiment.
Figure 1C:
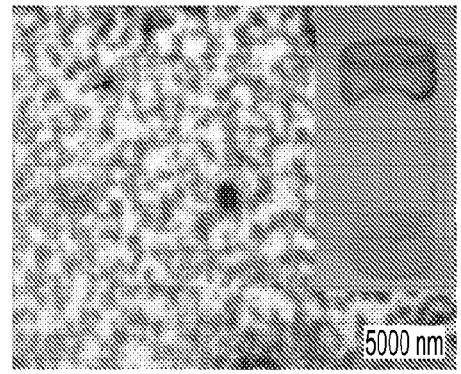
FIG. 1C shows a transmission electron microscopy image of a battery electrolyte including the IL-NIM in accordance with the first embodiment.

II. Zirconia Nanoparticle Tethered Ionic-Liquid Nanoscale Ionic Material (IL-NIM) Compositions in Accordance with a First Embodiment A. Experimental Results The IL-NIMs disclosed as a first embodiment within this section were prepared by covalently tethering imidazolium-based ILs to zirconia ($ZrO_2$) nanoparticles, as illustrated in FIG. 1A, in a single pot synthesis. The IL precursor was synthesized using a generally conventional method and the $ZrO_2$ nanoparticle cores were created using a modified Stober scheme. A similar approach can be used to create an IL-NIM based on most other metal oxide core nanoparticle materials. Results from light scattering measurements, as illustrated in FIG. 1B, show that the average particle size is 86±2 nm and that the related particle size distribution is narrow. The inset to FIG. 1C shows that an IL-NIM battery electrolyte containing 1M LiTFSI is a gel-like fluid at room temperature. Transmission electron microscopy (TEM) images as illustrated in FIG. 1C of these battery electrolytes show that they are hybrids comprised of a dense collection of nanostructures.

Figure 2:
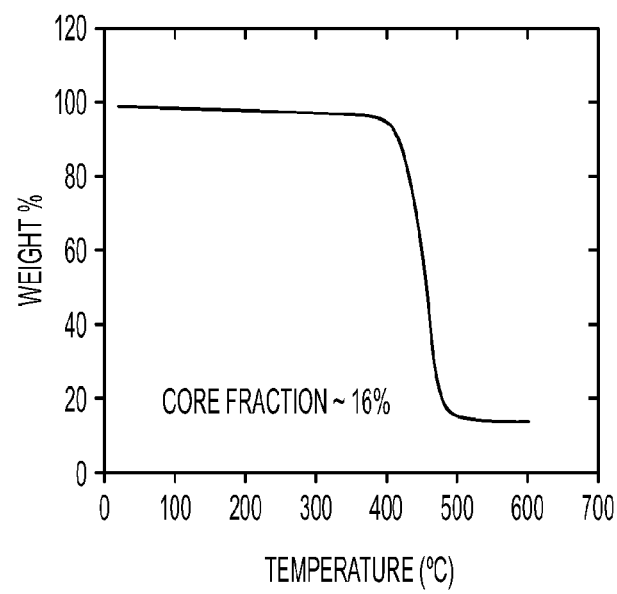
FIG. 2 shows a thermogravimetric analysis (TGA) spectrum of the battery electrolyte including the IL-NIM in accordance with the first embodiment.
Figure 3:
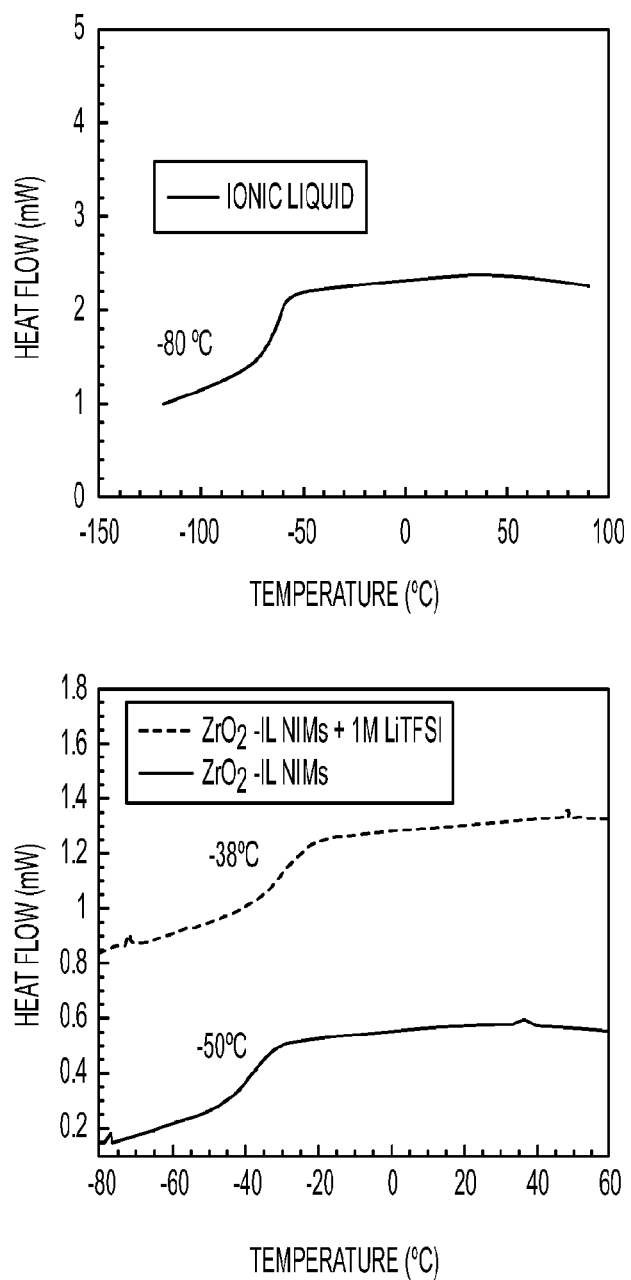
FIG. 3 shows differential scanning calorimetry (DSC) spectra for an IL, an IL-NIM and a battery electrolyte in accordance with the first embodiment.

Thermal properties of the battery electrolyte materials were characterized by differential scanning calorimetry (DSC) and thermal gravimetric analysis (TGA). The TGA data of FIG. 2 shows that the IL-NIM battery electrolytes are stable against thermal degradation up to temperatures exceeding 400° C. The DSC results of FIG. 3 indicate that the glass transition temperature ($T_g$) of the IL-NIM (−50° C.) is substantially higher than that of the precursor IL (−80° C.), implying that the constraints provided by the nanoparticle cores propagate down to the IL segments. The DSC data also suggests that covalent tethering of the IL to the $ZrO_2$ nanoparticle core lowers the overall mobility of IL constituents. The DSC data also indicates that addition of LiTFSI salt to the IL-NIM to provide a battery electrolyte further increased the $T_g$.

Figure 4:
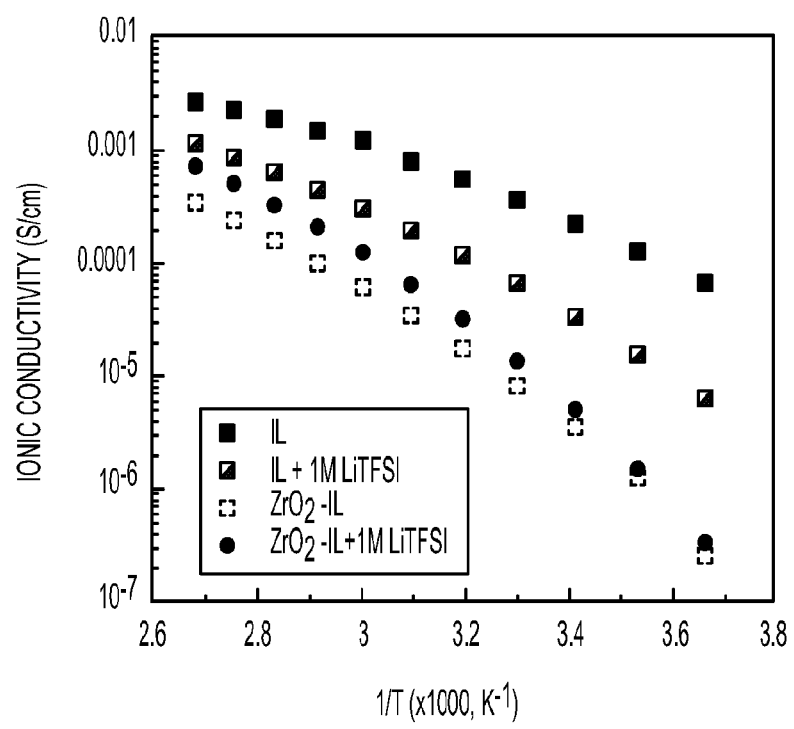
FIG. 4 shows a graph of ionic conductivity as a function of inverse temperature for an IL, an IL-NIM and a battery electrolyte in accordance with the first embodiment.

Ionic conductivities of the IL and IL-NIM with and without I M LiTFSI were measured using dielectric spectroscopy at different temperatures. FIG. 4 compares the measured ionic conductivities as a function of temperature. The addition of LiTFSI to the IL increases a viscosity, which results in a lower ionic conductivity. However, in the case of the IL-NIM, addition of LiTFSI salt produces a measurable increase in ionic conductivity. At room temperature, ionic conductivity values for both the LiTFSI doped IL and LL-NIM may be comparable to that of other polymer electrolytes. FIG. 4 also shows that the temperature dependence is of the Vogel-Fulcher-Tammann (VFT) type, characteristic of a typical glass forming system. The VFT parameters are provided in the following Table I.

TABLE I

| System | A (S/cm) | B (K) | $T_0$ (K) |
| --- | --- | --- | --- |
| Ionic Liquid (IL) | 0.032 ± 0.008 | 590 ± 69 | 220 ± 11 |
| IL + 1M LiTFSI | 0.19 ± 0.01 | 1000 ± 22 | 180 ± 2 |
| IL-NIMs | 0.59 ± 0.1 | 1600 ± 85 | 160 ± 5 |
| IL-NIMs + 1M LiTFSI | 0.36 ± 0.07 | 1100 ± 68 | 190 ± 5 |

Figure 5:
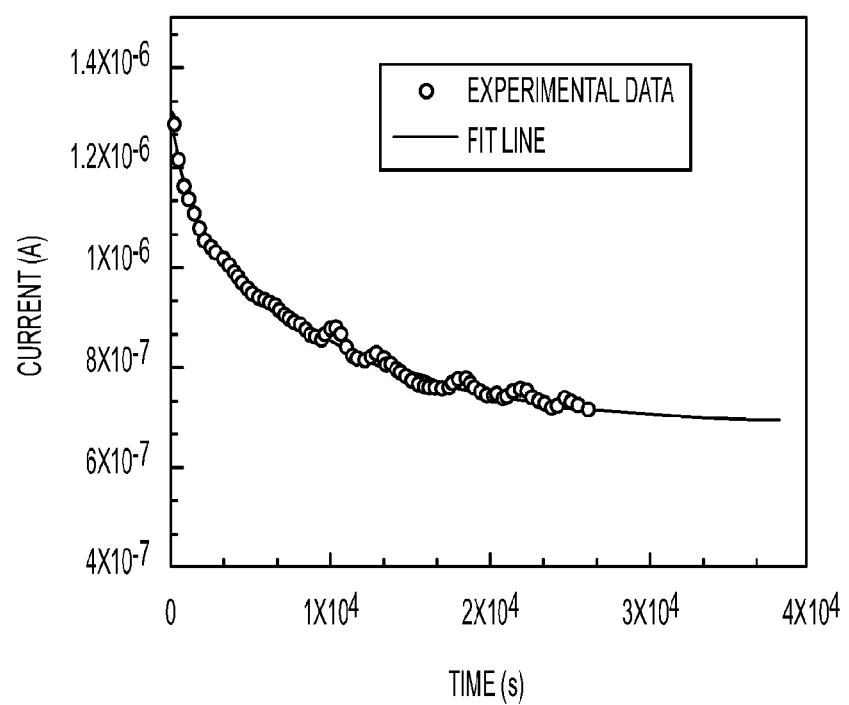
FIG. 5 shows a graph of current versus time for a polarization decay of an IL-NIM in accordance with the first embodiment.

An ideal Li battery electrolyte should be permeable only to Li ions. However, in practical situations contributions from counterions can be appreciable. The Li ion transference number ($T_{Li+}$), the Li ion contribution to ionic conduction, of IL-NIMs was measured by imposing a step dc polarization. Results are illustrated in FIG. 5. This approach yielded $T_{Li+}=0.35\pm0.04$, which is more than one order of magnitude larger than the pure IL electrolytes (0.05). The improvement in $T_{Li+}$ is believed to reflect immobilization of the IL cations by the $ZrO_2$ nanoparticle core, which substantially reduces their contribution in ionic conduction.

Figure 6:
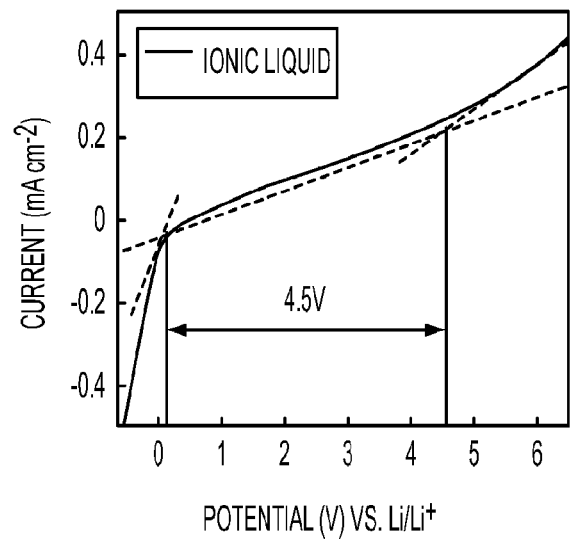
FIG. 6 shows linear sweep voltammogram spectra for an IL and an IL-NIM in accordance with the first embodiment.
Figure 6:
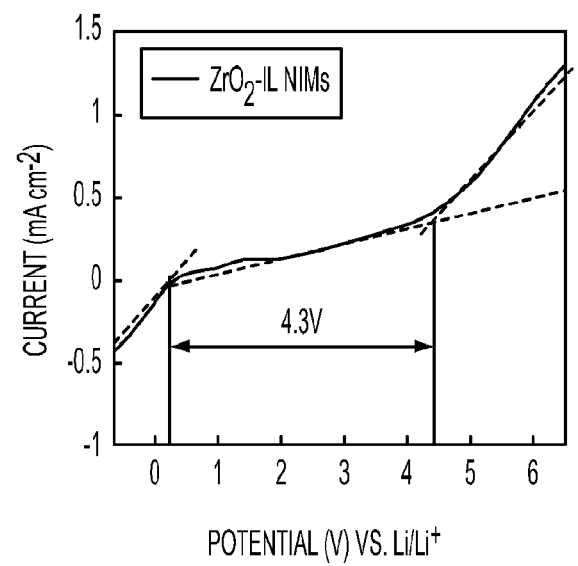
Figure 7:
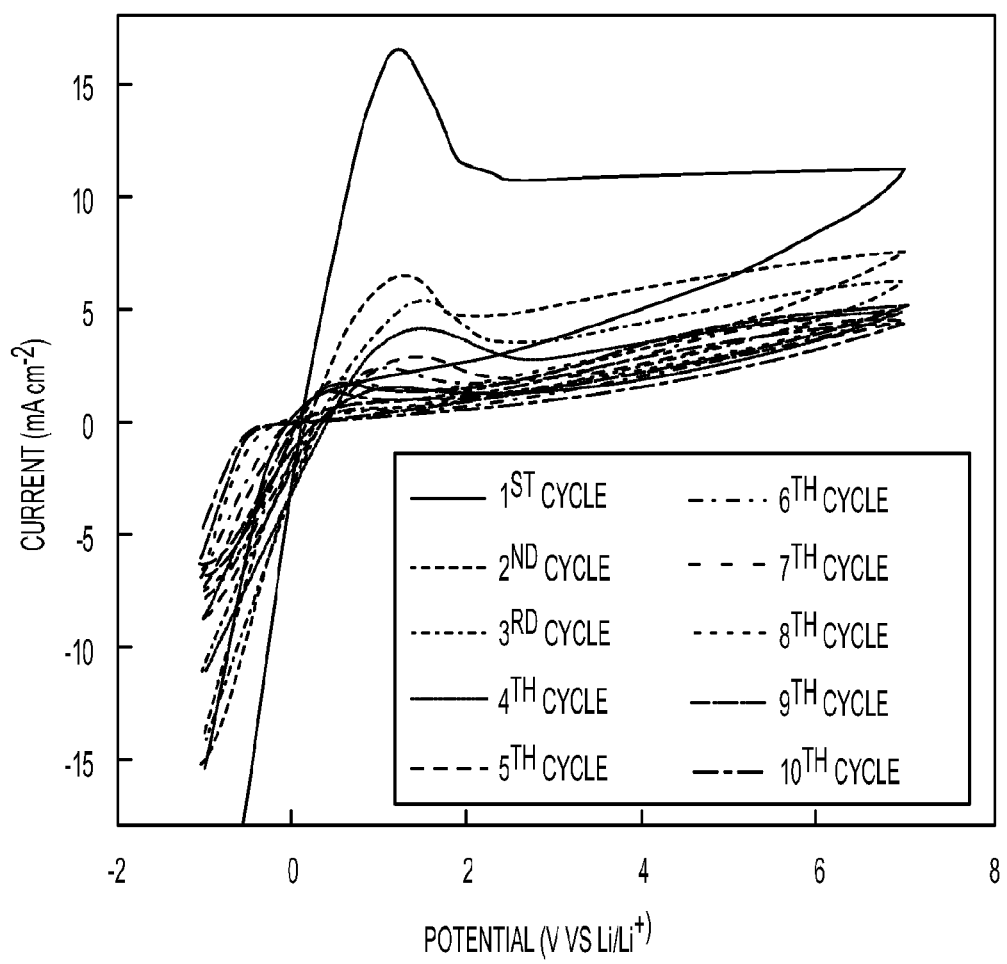
FIG. 7 shows a cyclic voltammogram spectrum for a symmetric cell using a battery electrolyte in accordance with the first embodiment.

Two other desirable characteristics for a successful Li battery electrolyte are electrochemical stability over the voltage range of interest in anticipated applications, and good interfacial stability towards the Li metal electrode. The electrochemical stability window (EW) of an IL-NIM was determined against a Li metal electrode using linear sweep voltammetry (i.e., as illustrated in FIG. 6) and cyclic voltammetry (i.e., as illustrated in FIG. 7). The voltage region demarking the onset of anion oxidation and cation reduction, is seen to be about 4.5V vs Li for the IL liquid and 4.3V for the IL-NIM, indicating that the improvement in $T_{Li+}$ for the IL-NIM battery electrolyte is achieved without loss of electrochemical robustness of the IL corona.

Figure 8:
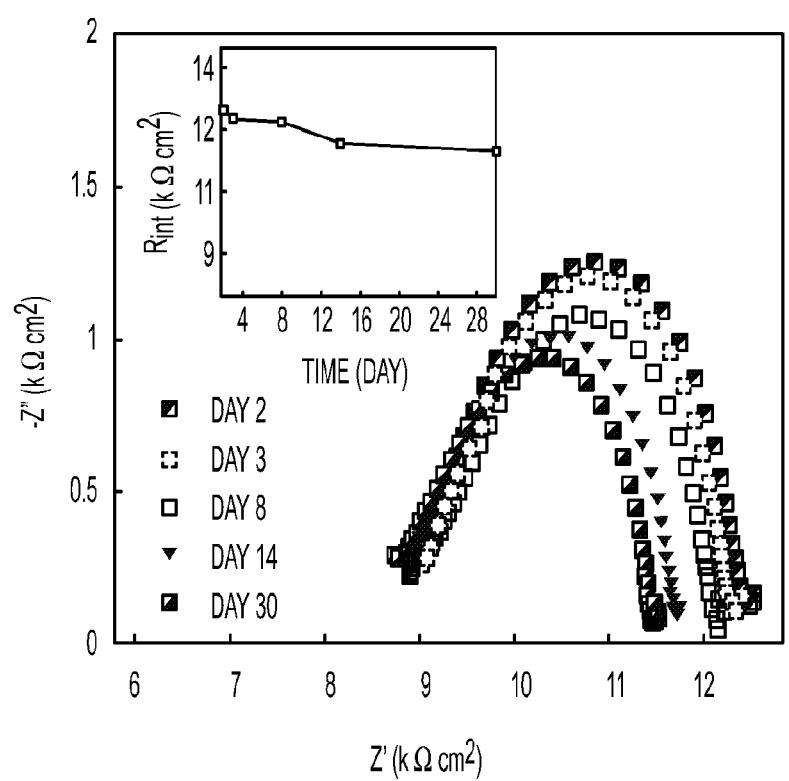
FIG. 8 shows a Nyquist plot for the lithium symmetric cell using the battery electrolyte in accordance with the first embodiment.
Figure 9:
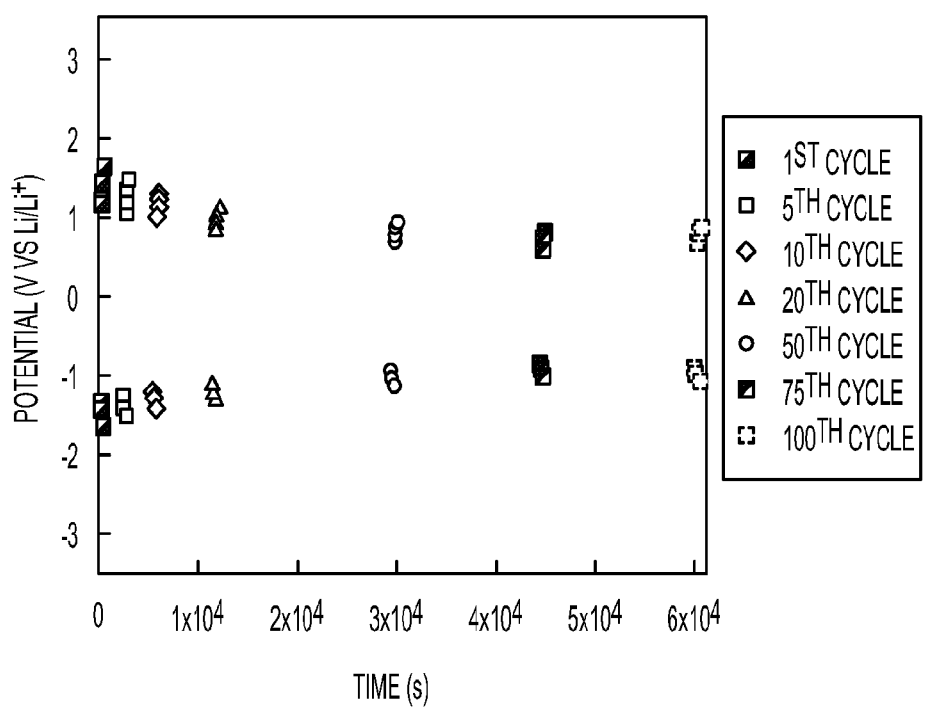
FIG. 9 shows a graph of potential profile as a function of time for galvanostatic testing for the symmetric cell using the battery electrolyte in accordance with the first embodiment.

To evaluate the stability of the Li/IL-NIM interface, the interfacial resistance of the Li metal electrode and an IL-NIM electrolyte was monitored over a one-month period using electrochemical impedance spectroscopy. FIG. 8 shows the evolution of impedance spectra, collected at open circuit potential of "Li/electrolyte+Li salt/Li" cell, as a function of time. The time evolution of the Li interfacial resistance was estimated by fitting the impedance spectra to an appropriate equivalent electrical circuit. As shown in FIG. 8 (inset), the interfacial resistance exhibits little, if any, change with time, confirming the stability of the IL-NIM battery electrolyte towards Li metal. Additionally, the interface stability and reversibility of the IL-NIM battery electrolyte was evaluated using lithium stripping-plating experiments. For these experiments, a current flux of 1 µA/cm² was applied to a "Li/electrolyte+Li salt/Li" symmetric cell for 5 mins before reversing the polarity. The resulting voltage profiles due to Lithium plating/stripping are provided in FIG. 9. It is clearly evident that the voltage profiles stabilize after 5 cycles and exhibit time invariant characteristics for 100 cycles similar to the impedance studies. This result nicely confirms the interfacial stability and reversibility of $ZrO_2$-IL NIM battery electrolyte towards Li metal.

Figure 10A:
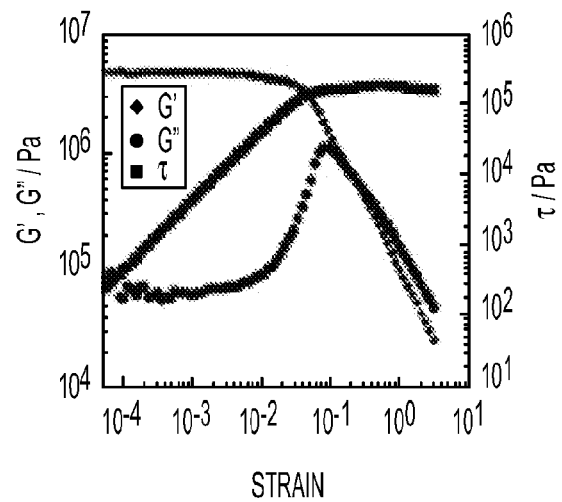
FIG. 10 shows graphs of mechanical properties of the battery electrolyte in accordance with the first embodiment.
Figure 10B:
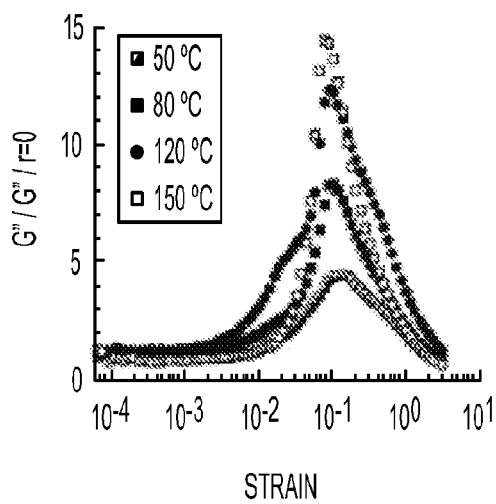

As is understood by a person skilled in the art, another desirable characteristic of a good electrolyte for Li metal cells is a mechanical strength. Dynamic shear moduli of an IL-NIM was measured as a function of shear strain. In a typical measurement, an oscillatory shear strain was imposed with a fixed frequency ($\omega=10$ rad/s) and the dynamic storage (G') and loss (G") moduli measured as a function of applied strain. FIG. 10, top graph, depicts the strain dependent moduli and shear stress for the IL-NIM. At low strains, G' and G" are seen to be independent of the applied strain and G'>>G", both characteristics of a solid-like elastic material. The elastic modulus in the limit of zero strain is found to be 4.5 MPa, i.e. more than five orders of magnitude higher than that of the untethered ionic liquid. With progressive increase in shear strain, G" rapidly increases, exhibits a pronounced maximum, and subsequently dominates G'; indicative of a strain-induced transition to a fluid-like state. All of these observations are generic behaviors seen in a class of materials, termed as "soft glasses." In the soft glass framework, the maximum in G" and the transition from solid to liquid-like behavior are predicted to be accompanied by a change in slope of the shear stress τ, which is evidently also observed in the present material of FIG. 10, top graph, and is a macroscopic consequences of yielding of the nanoscale cages that constrain each IL-NIM building block. FIG. 10, bottom graph, clearly shows that the loss modulus maximum increases as temperature is increased and the yield strain, strain at which the loss maximum occurs, is nearly independent of temperature. Neither feature can be explained in the soft glassy rheology framework, but imply that the IL-NIM becomes mechanically stronger as temperature is increased in this range.

In summary, the foregoing first embodiment shows that by densely tethering ionic liquids to nanoparticles it is possible to create a family of electrolytes that possess multiple attractive attributes for Li battery applications. Specifically, the foregoing first embodiment shows that an IL-NIM based on a $ZrO_2$ core nanoparticle spontaneously forms a porous media with tunable mechanical properties, exhibits excellent thermal stability, wide redox stability windows, good Li ion transference numbers, and moderate ionic conductivities. Additionally, the foregoing first embodiment shows that these electrolytes exhibit excellent time-invariant interfacial stability against Li metal.

B. Experimental Details

The IL precursor, 1-undocyltrimethoxysilane-3-butyl imidazolium bis(trifluoromethylsulfonyl)imide was synthesized using a conventional literature procedure. Purity of the IL was verified using Nuclear Magnetic Resonance spectroscopy. The as prepared IL was tethered to $ZrO_2$ nanoparticles in a single pot synthesis using a modified Stober-type sol-gel method. In a typical reaction, 0.4 mL of zirconium iso(butoxide) and 0.4 mL of 0.1 M KCl were mixed in 100 mL of absolute ethanol. After about 20 min., when the solution became hazy indicating the formation of $ZrO_2$ nanoparticles, 3 g of IL was added and the contents stirred for at least 48 hrs.

IL tethered ZrO$_2$ nanoparticles were collected by centrifuging and washing with anhydrous ethyl ether.

TGA and DSC measurements were conducted using TA instruments model Q5000 and Q2000 thermal gravimetric analyzer and differential scanning calorimeter, respectively. TEM images were taken at 120 kV using a TECNAI F12 TEM. Ionic conductivity was measured with a Novacontrol's dielectric spectrometer outfitted with a Quatro temperature control system. Electrochemical measurements were performed using a Solartron's CellTest model potentiostat. Impedance measurements were conducted using a Solartron Frequency Response Analyser (Model 1252) at frequencies ranging from 100 kHz to 100 mHz and at 25 mV. Lithium symmetric coin cells were prepared in a Mbraun glovebox. Rheology measurements were obtained using an Anton Parr MCR 501 mechanical Rheometer.

Figure 11:
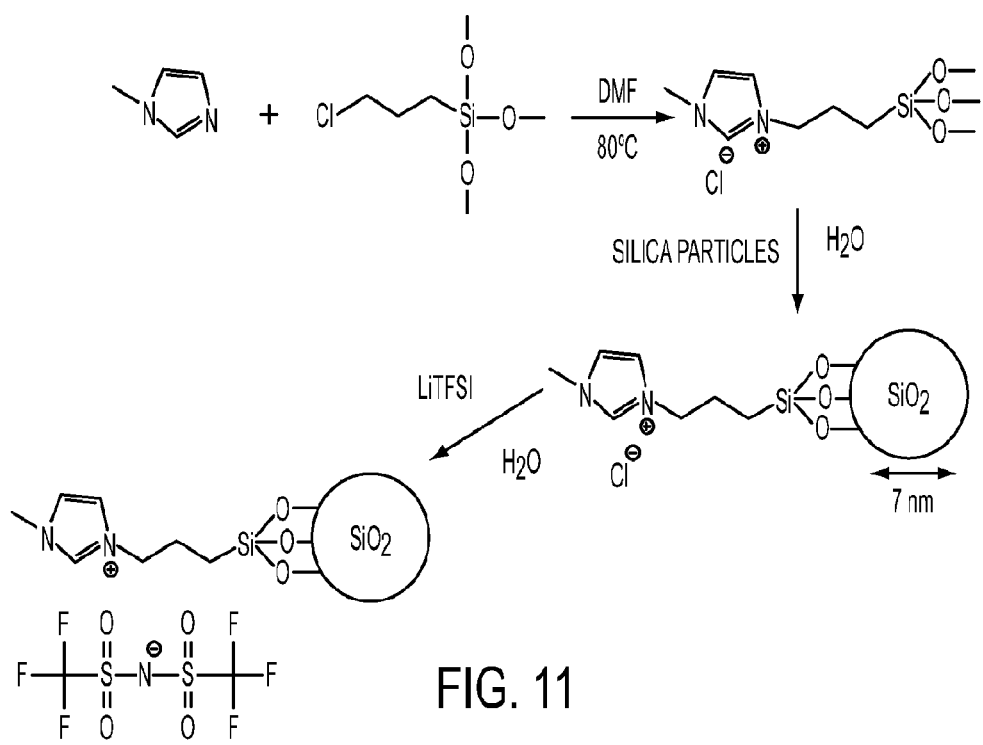
FIG. 11 shows a reaction scheme for preparing an IL-NIM in accordance with a second embodiment.

III. Silica Nanoparticle Tethered Ionic-Liquid Nanoscale Ionic Material (IL-NIM) in Accordance with a Second Embodiment As indicated above, the embodiments contemplate several metal oxide nanoparticles in addition to zirconia nanoparticles for use when preparing an IL-NIM, and also a battery electrolyte predicated upon the IL-NIM. Thus, a particularly prevalent and common choice for metal oxide nanoparticle is silica. To that end, a silica based IL-NIM was prepared using generally similar processing sequence in comparison with the foregoing zirconia based IL-NIM. A specific processing scheme for preparing such silica based IL-NIM is illustrated in FIG. 11. The processing scheme that is used within the context of FIG. 11 is generally similar to the processing scheme that may be used in accordance with the first embodiment to provide the IL-NIM illustrated in FIG. 1, but with the exception of use of a methyl-propyl-imidazolium nitrogen cation material.

Figure 12A:
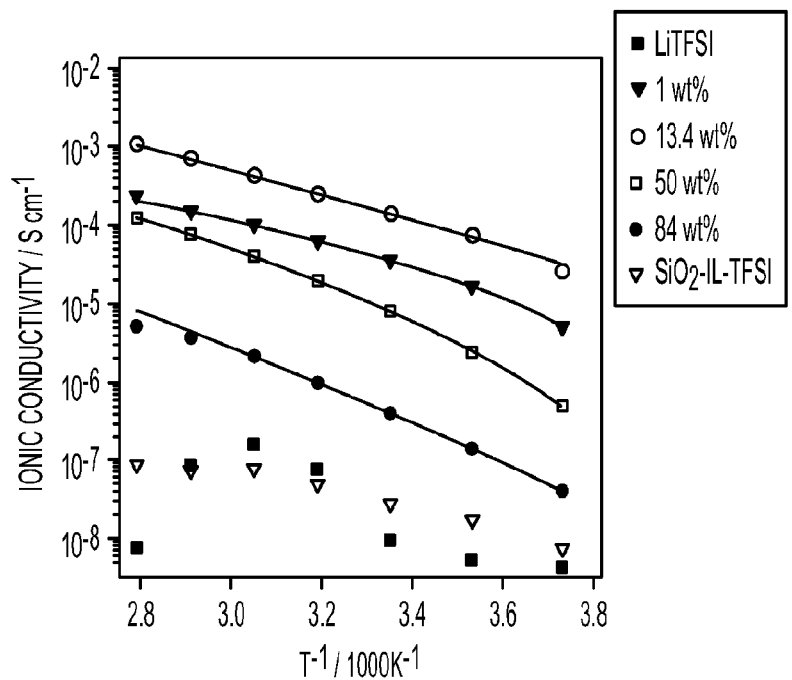
FIG. 12a shows a graph of ionic conductivity as a function of temperature and silica weight percent loading for the IL-NIM in accordance with the second embodiment.

For comparison purposes, the ionic conductivity of the SiO$_2$-IL-TFSI battery electrolytes in accordance with this second embodiment is presented in FIG. 12a as a function of temperature and LiTFSI loading. The experimental data is fit by a VFT form, $\sigma = A \exp(-B/(T-T_0))$, where A is the pre-exponential factor, for the range of temperature studied, B is the effective activation energy barrier for coupled ions and local segment motion in thermal units, and T and $T_0$ are the measurement and reference temperatures, respectively. The VFT parameters are summarized in Table II for all of the materials evaluated within the context of this second embodiment. It should be noted that VFT-like temperature-dependent ionic conductivities are found in electrolytes where local segmental motion, chain relaxation and crystallinity play important roles, and the motion of the ions themselves from one battery electrolyte site to another is of minor importance. Although perhaps expected for systems such as this second embodiment, where the chain length of the tethered ionic liquid is small compared with the diameter of silica nanoparticle core, thus the VFT dependence implies that the ionic conductivity of the SiO$_2$-IL-TFSI/LiTFSI battery electrolyte mixtures can be understood in terms of local segmetal and breathing motions of molecules in the materials.

TABLE II

| Sample: wt % SiO$_2$-IL-TFSI/(1-wt %) LiTFSI | VFT Fitting Parameters | | |
| --- | --- | --- | --- |
| | A(S cm$^{-1}$) | B(K) | T$_0$(K) |
| 1 | 0.0047 ± 0.001 | 540 ± 75 | 188 ± 8 |
| 3 | 0.0049 ± 0.0007 | 429 ± 35 | 192 ± 4 |
| 7.5 | 0.007 ± 0.0007 | 455 ± 23 | 188 ± 10 |
| 9.67 | 0.01 ± 0.0006 | 514 ± 16 | 183 ± 19 |
| 13.4 | 1.53 ± 5.8 | 2014 ± 1755 | 82 ± 10 |
| 15.6 | 0.021 ± 0.03 | 701 ± 398 | 170 ± 38 |
| 20 | 0.0016 ± 0.0006 | 238 ± 62 | 219 ± 11 |
| 30 | 0.0037 ± 0.001 | 421 ± 71 | 204 ± 9 |
| 40 | 0.0021 ± 0.0005 | 400 ± 45 | 208 ± 6 |
| 50 | 0.032 ± 0.02 | 1009 ± 181 | 177 ± 12 |
| 64.5 | 0.0037 ± 0.0046 | 851 ± 335 | 175 ± 27 |
| 84 | 0.42 ± 0.33 | 2969 ± 344 | 84 ± 13 |

Figure 12B:
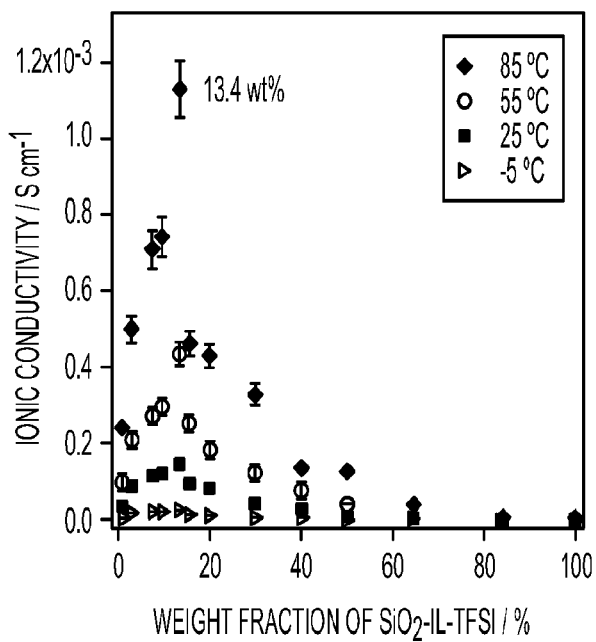
FIG. 12b shows a graph of ionic conductivity as a function of weight fraction $SiO_2$-IL-TFSI and temperature for the IL-NIM in accordance with the second embodiment.

FIG. 12b shows the effect of LiTFSI composition on the isothermal ionic conductivity. It is apparent from FIG. 12b that the ionic conductivity of all mixtures is significantly enhanced over the pure components throughout the examined temperature range. Notably, FIG. 12b shows that the isothermal conductivities of SiO$_2$-IL-TFSI/LiTFSI mixtures exhibit a pronounced maximum, with mixtures containing 13.4 wt % SiO$_2$-IL-TFSI displaying the highest ionic conductivity. At room temperature, the ionic conductivity of the 13.4 wt % SiO$_2$-IL-TFSI mixture is approximately 10$^{-4}$ S/cm, which is more than three orders of magnitude higher than that of either of the pure components. It is also apparent from the data in Table II that the pre-exponential factor A also exhibits a maximum with increasing SiO$_2$-IL-TFSI content in the electrolyte, whereas the two other parameters, B and T$_0$, do not exhibit any well-defined trend. This implies that the principal source of the conductivity increase upon addition of SiO$_2$-IL-TFSI is an effectively higher concentration of mobile ions in the electrolyte.

Figure 13:
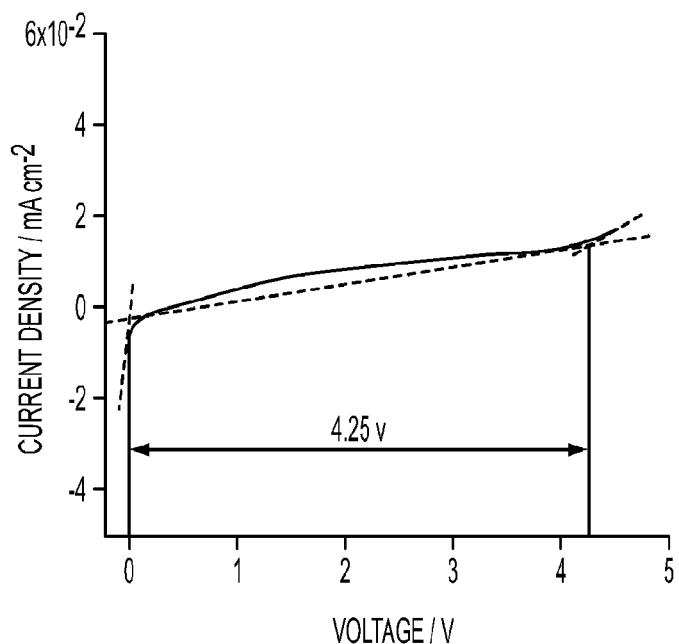
FIG. 13 shows linear sweep and cyclic voltammogram spectra for a symmetric cell using a battery electrolyte in accordance with the second embodiment.
Figure 13:
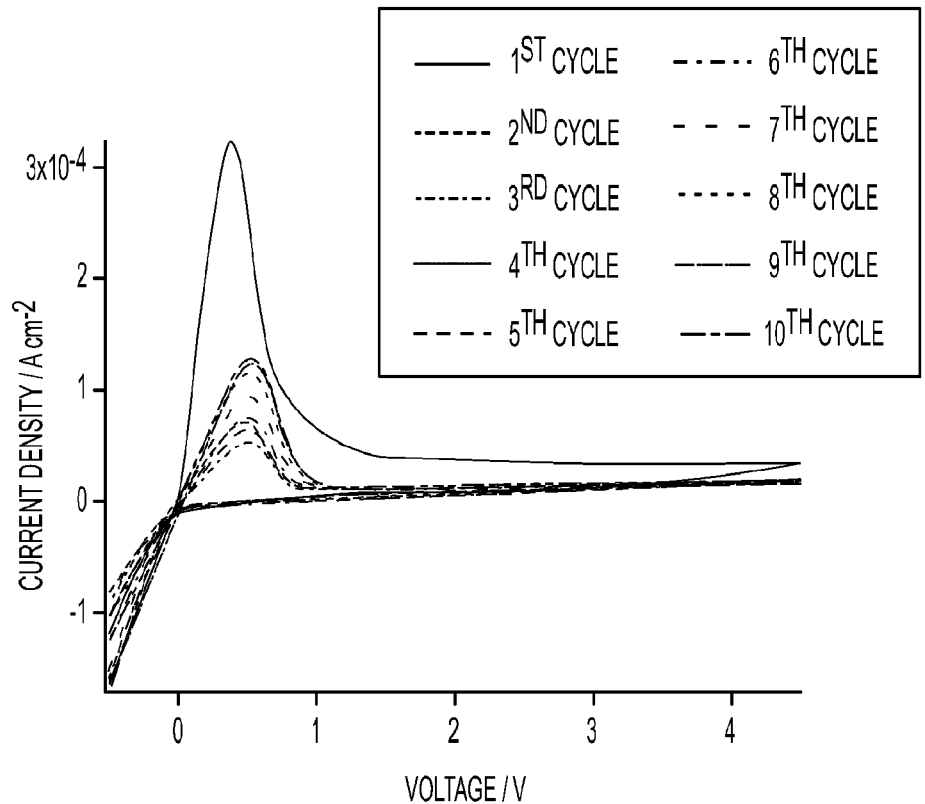

The electrochemical stability of the 13.4 wt % SiO$_2$-IL-TFSI/LiTFSI hybrid battery electrolyte is also attractive. Specifically, the stability window of the electrolyte that exhibits the largest ionic conductivity was characterized using linear sweep voltammetry in a symmetric lithium coin cell at room temperature, as illustrated in FIG. 13, top graph. The material is seen to display an EW of around 4.25 V vs. Li/Li$^+$. This stability has been confirmed using cyclic voltammetry, as illustrated in FIG. 13, bottom graph, which shows that following the 1$^{st}$ cycle (i.e., the high current cycle), the materials exhibit repeatable I-V curves for the following nine cycles.

Figure 14A:
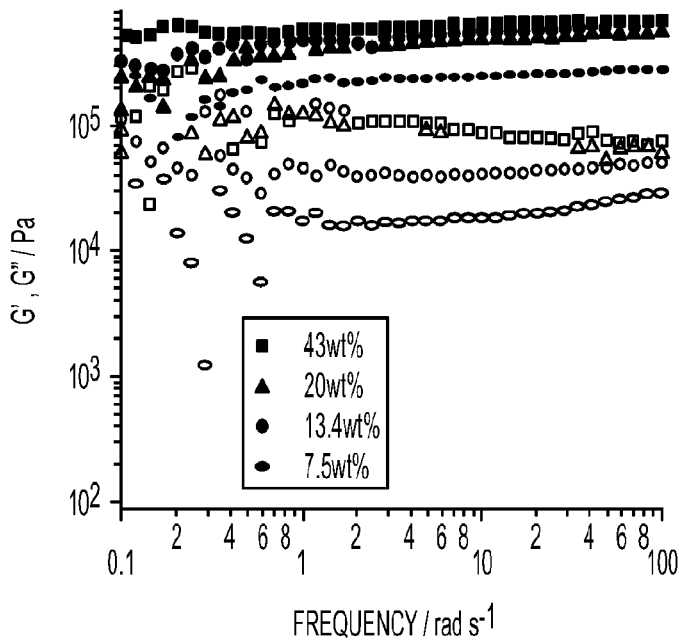
FIG. 14 shows graphs of mechanical properties for a battery electrolyte in accordance with the second embodiment.
Figure 14B:
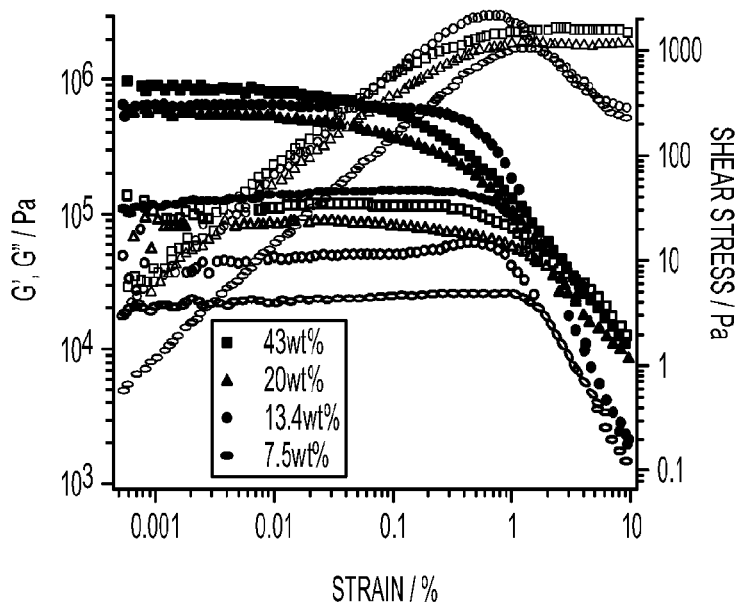

FIG. 14a and FIG. 14b report mechanical properties of the SiO$_2$-IL-TFSI/LiTFSI battery electrolyte mixtures over the same range of SiO$_2$-IL-TFSI compositions where the maximum ionic conductivity is observed. FIG. 14a and FIG. 14b show that the materials exhibit distinctive solid-like rheological properties, wherein the elastic/storage modulus, G', is substantially larger than the loss/viscous modulus G". FIG. 14a and FIG. 14b further show that both G' and G" become larger as the SiO$_2$-IL-TFSI content is increased, which is consistent with normal expectations for polymer-particle hybrids. Finally, FIG. 14a shows that both moduli are at most weak functions of the strain frequency (deformation rate) and that the dependence becomes weaker as the SiO$_2$-IL-TFSI content is increased. These observations are consistent with the consideration that the electrolytes become more solid-like as the nanoparticle loading is increased and the particles become jammed.

FIG. 14b shows that at low shear strains, G' and G" are independent of strain, and G'>G", characteristics of a solid-like, linear elastic material. However, upon application of sufficient levels of strain, the electrolytes yield and transition to a regime where the shear stress (right axis) exhibits a pronounced change of slope characteristic of yielding and plastic flow. For the materials containing 7 wt % and 13 wt % $SiO_2$-IL-TFSI, the yielding transition is accompanied by a noticeable maximum in G". This maximum has been reported previously to be a characteristic of a class of materials termed soft glasses, it is believed to originate from breakage of cages provided by surrounding particles that jam motion of any given particle in the hybrids. This feature of the electrolytes is important for practical reasons. It indicates that while they might be solid-like under normal battery operating conditions (zero strain) they can be processed into complex shapes by application of strain. It also suggests that under normal battery operating conditions, the hybrid $SiO_2$-IL-TFSI particles will not move, and as such can serve as an immobile source or sink for TFSI ions.

IV. Ionic-Liquid Nanoscale Ionic Material (IL-NIM) Using Silica and an IL Host Material in Accordance with a Third Embodiment Insofar as the foregoing embodiments that are predicated upon zirconia based IL-NIM and silica based IL-NIM materials are consistently illustrative of application of such zirconia based IL-NIM and silica based IL-NIM materials within battery electrolytes, and in particular within lithium battery electrolytes, additional embodiments are intended to be directed towards further improvements with respect to battery electrolyte properties of IL-NIM materials.

Figure 15:
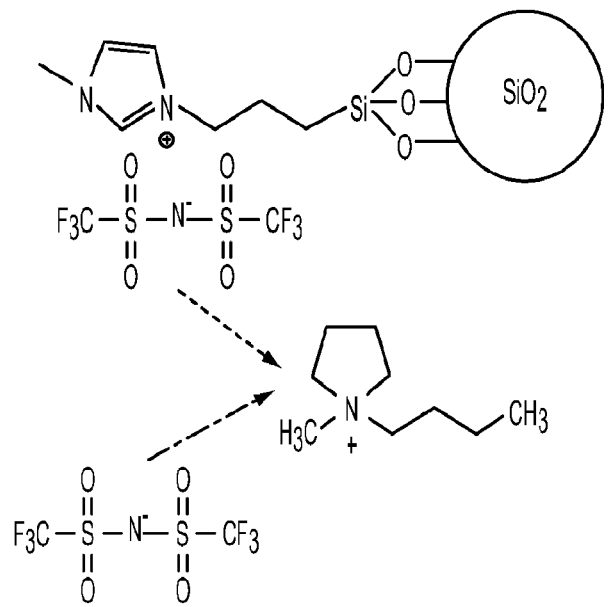
FIG. 15 shows a reaction scheme for forming an IL-NIM composition in accordance with a third embodiment.

To that end, additional investigations were undertaken within the context of a battery electrolyte composition that included an additional host component IL material, but not an IL-NIM material. The particular IL-NIM plus host material is illustrated in FIG. 15, which illustrates the same silica nanoparticle tethered IL-NIM that was used in the second embodiment, but now also including a methyl-butyl-pyrrolidinium nitrogen cation moiety and the same TFSI counter anion.

Figures 16A, 16B:
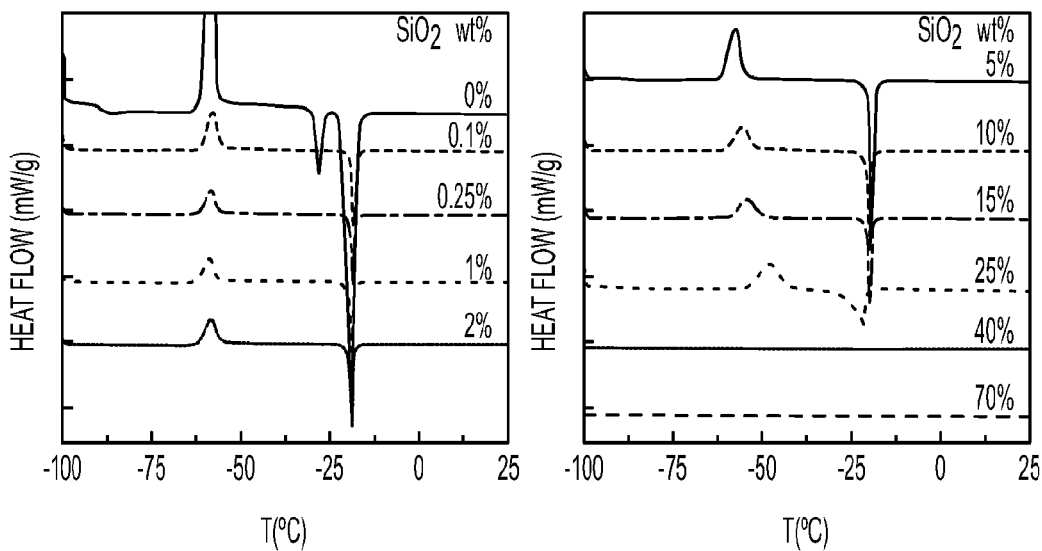
FIG. 16a and FIG. 16b show differential scanning calorimetry results of IL-NIM compositions in accordance with the third embodiment.

The main results of such further investigations with respect to the host material in accordance with the third embodiment are summarized in FIG. 16a and FIG. 16b. FIG. 16a and FIG. 16b report on thermal transitions in 1-butyl-3-methyl-pyrrolidinium bis(trifluoromethylsulfonyl imide IL (BmpyrTFSI), as well as for the BmpyrTFSI/SiO$_2$-IL TFSI dispersions, deduced from differential scanning calorimetry (DSC) measurements at a fixed temperature ramp rate of 5° C./min. FIG. 16a shows that pure BmpyrTFSI IL manifests a glass transition at a temperature, $T_g \approx -87°$ C., a crystallization transition at, $T_c \approx -60°$ C., and a melting transition at a temperature $T_m \approx -18°$ C. BmpyrTFSI also exhibits a metastable phase with melting temperature of −24° C. The crystallization transition following $T_g$ indicates that the as prepared material is in a supercooled state.

Remarkably, FIG. 16a also shows that addition of as little as 0.1 wt % $SiO_2$-IL-TFSI (1-trimethoxysilyl propyl-3-methyl-imidazolium bis(trifluoromethylsulfonyl)imide) nanoparticles to BmpyrTFSI has a dramatic effect on both the crystallization and melting transitions, but no effect on the glass transition. Specifically, FIG. 16a shows that $T_g$ for the BmpyrTFSI IL is unaffected by addition of $SiO_2$-Sp-mImTFSI, but that both the energy change due to crystallization from the supercooled state and from the melting transition are considerably reduced. The transition temperatures however remain more or less the same. At higher loadings of the $SiO_2$-IL TFSI nanostructures, the effect remains, but its magnitude is largely unaffected by the nanoparticle content. However, at 40 wt % particle loading, as illustrated in FIG. 16b, both the crystallization and melting transitions disappear, and the material exhibits only a glass transition temperature ($T_g \approx -85°$ C.), essentially the same as for the pure BmpyrTFSI.

V. Ionic-Liquid Nanoscale Ionic Material (IL-NIM) Using Silica Nanoparticles and a Propylene Carbonate Host Material in Accordance with a Fourth Embodiment As has been suggested above, desirable within the context of a battery electrolyte in accordance with the embodiments is a battery electrolyte that inhibits lithium dendrite growth.

To that end, a battery electrolyte composition in accordance with the fourth embodiment utilized a battery electrolyte composition in accordance with the second embodiment, and added a propylene carbonate host material at a concentration ranging from 1 to 100 weight percent with respect to the IL-NIM and a LiTFSI salt at a concentration ranging from 1 to 50 weight percent with respect to the IL-NIM.

Figure 17A:
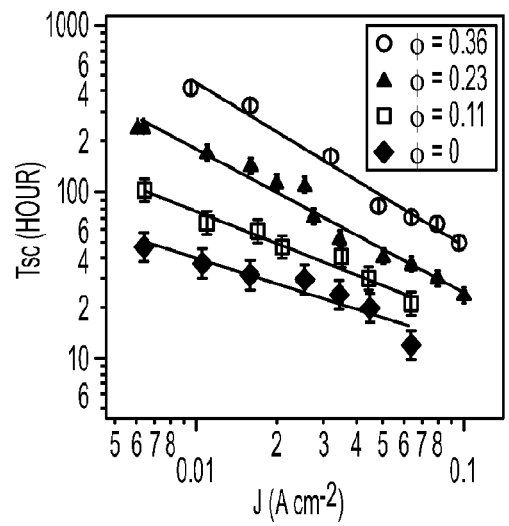
FIG. 17a and FIG. 17b show dendrite growth characteristics for a battery electrolyte composition in accordance with a fourth embodiment.

FIG. 17a reports $T_{SC}$ as a function of current density for various $SiO_2$-IL-TFSI nanoparticle loadings. It is immediately apparent from FIG. 17a that the $SiO_2$-IL-TFSI nanoparticles have a measurable effect on both the magnitude and current density, J, dependence of $T_{SC}$. At low J, $T_{SC}$ exhibits an approximate power-law relationship, $T_{SC}$:$J^{-m}$, over the range measured.

Figure 17B:
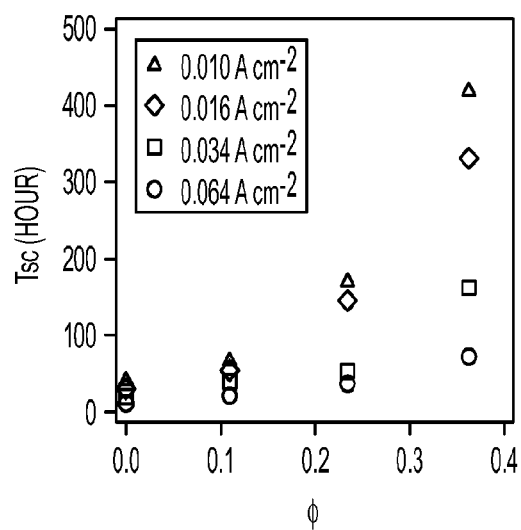

FIG. 17b summarizes the influence of $SiO_2$-IL-TFSI nanoparticle loading on the magnitude of the short-circuit time. The plot of $T_{SC}$ as a function of volume fraction at fixed current density shows that $T_{SC}$ increases significantly with increasing particle content at each current density, and at all current densities $T_{SC}$ is as much as one order of magnitude larger than for a pure PC-LiTFSI ($\phi=0$) electrolyte. The results in FIG. 17b further demonstrate that at low to moderate current densities the $SiO_2$-IL-TFSI nanoparticle-based hybrid electrolytes may improve the operating time of the cells by several hundred hours.

Figure 18A:
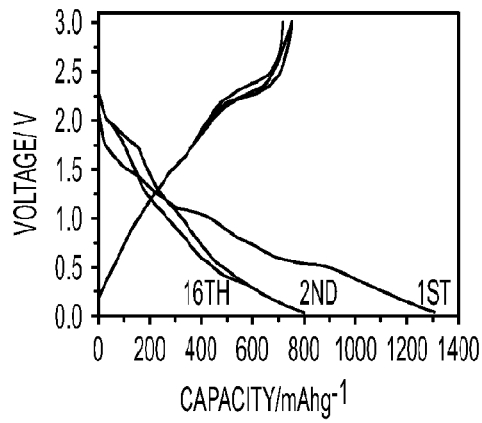
FIG. 18a, FIG. 18b, FIG. 18c and FIG. 18d show applicability of a battery electrolyte composition in accordance with the fourth embodiment within the context of various batteries.
Figure 18B:
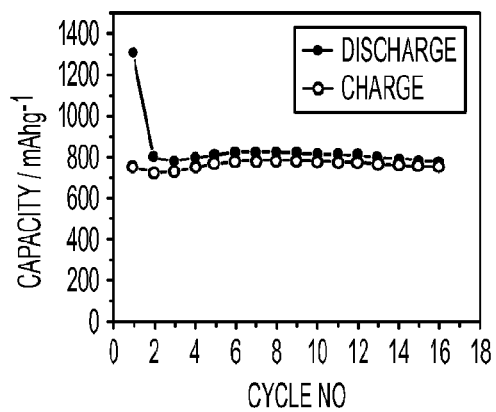
Figure 18C:
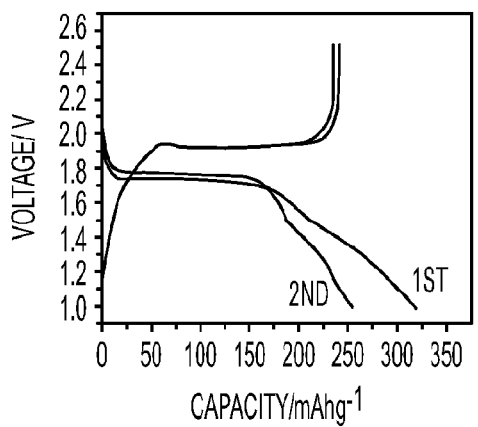
Figure 18D:
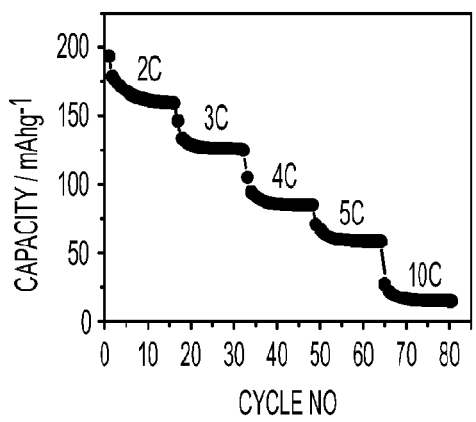

FIG. 18a shows galvanostatic charge (Li deinsertion)/discharge (Li insertion) profiles obtained in a Li/MoS$_2$ battery at a current density of 100 mAhg$^{-1}$. The results are generally consistent with characteristics profiles of MoS$_2$ obtained from galvanostatic cycling measurements in commercial 1M Li$^+$-EC/DMC electrolytes. MoS$_2$ is seen to exhibit a capacity of 1310 mAhg$^{-1}$ in the first discharge cycle and discharge plateaus at 1.1 V and 0.6 V. In the subsequent 1$^{st}$ charge and 2$^{nd}$ discharge cycles, the capacities are 752 mAhg$^{-1}$ and 800 mAhg$^{-1}$ with voltage plateaus at 2.3 V and 1.9 V, respectively. The battery electrolyte shows good stability over the measured 15 charge-discharge cycles, as illustrated in FIG. 18b, with a capacity of 750 mAhg$^{-1}$ after the 15$^{th}$ cycle. Similar charge/discharge profiles and cycling stability were observed with a commercial ethylene carbonate/dimethyl carbonate (EC/DMC) based electrolyte signifying that $SiO_2$-IL-TFSI/PC electrolytes are tolerant to high energy density electrodes. The charge-discharge profiles obtained for the $SiO_2$-IL-TFSI/PC, $\phi=0.23$, hybrid electrolyte system with TiO$_2$ electrodes is shown in FIG. 18c. It is apparent that this material also exhibits charge-discharge profiles with distinct potential plateaus at 1.77 V and 1.91 V for the discharging and charging processes. These results are nearly identical to what is obtained using anatase TiO$_2$ electrodes with commercial electrolytes. FIG. 18d shows the rate capability of the TiO$_2$ electrodes. It is apparent from FIG. 18d that the electrolyte can sustain current rates as high as 10 C with an average capacity of 20 mAhg$^{-1}$. One may therefore strongly suggest that the bulk and interfacial mobility of lithium ions in $SiO_2$-IL-TFSI/PC electrolytes in accordance with this fourth embodiment is sufficient to sustain high power density electrodes even for room temperature battery operation.

VI. Ionic-Liquid Nanoscale Ionic Material (IL-NIM) Using Silica and Poly(ethylene oxide) Host in Accordance with a Fifth Embodiment This particular embodiment also derives from the battery electrolyte composition in accordance with the second embodiment.

Within this fifth embodiment IL-NIM based battery electrolytes were prepared by blending different weight fractions (wt %) of IL functionalized $SiO_2$ nanoparticles in moderately low molecular weight poly (ethylene oxide) (PEO) polymer (MW=400 g/mol) doped with a lithium salt, lithium bis(trifluoromethylsulfonyl)imide (LiTFSI).

Figure 19:
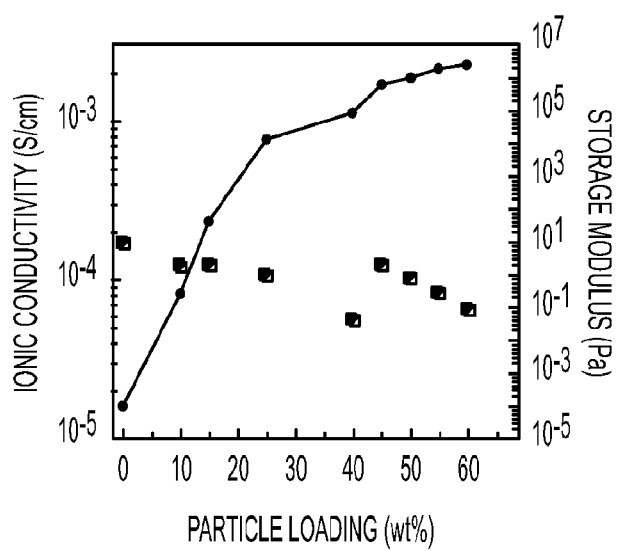
FIG. 19 shows a graph of ionic conductivity and storage modulus as a function of particle loading for a battery electrolyte in accordance with a fifth embodiment.

The as prepared $SiO_2$-IL-TFSI particles were dissolved in acetone and mixed with low molecular poly(ethylene oxide) (MW=400), containing 1M LiTFSI salt. Ionic conductivity and storage moduli of the hybrid electrolytes were measured using dielectric spectroscopy and Anton Parr MCR 501 mechanical rheometer, respectively. FIG. 19 shows the ionic conductivity and storage modulus plot of the IL tethered $SiO_2$ particle at various particle loadings. The conductivity and moduli for the suspensions are essentially decoupled, whereas the conductivity changes by at most a factor of three, the elastic/storage modulus, G', changes by 10 orders of magnitude over the same particle concentration range. This observation is significant because it suggests that this hybrid particle platform can be used to create hybrid electrolytes with exceptional mechanical properties, without significantly compromising conductivity.

All references, including publications, patent applications and patents cited herein are hereby incorporated by reference in their entireties to the extent allowed, and as if each reference was individually and specifically indicated to be incorporated by reference and was set forth in its entirety herein.

The use of the terms "a," "an" and "the" and similar referents in the context of describing the embodiments and the invention (especially in the context of the following claims) is to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein is merely intended to serve as a shorthand method of referring individually to each separate value falling within the range, unless otherwise indicated herein, and each separate value is incorporated into the specification as if it was individually recited herein.

All methods described herein may be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A method for preparing a material composition comprising:
preparing in-situ in solution a plurality of metal oxide nanoparticles by reaction of a metal oxide precursor material; and
reacting in-situ in solution the plurality of metal oxide nanoparticles with an ionic-liquid functionalized coupling agent material to provide a nanoparticle tethered ionic-liquid nanoscale ionic material tethered to only one nanoparticle, and absent cross-linking.

2. The method of claim 1 wherein the plurality of metal oxide nanoparticles comprises a metal oxide selected from the group consisting of silica, alumina, ceria, titania, vanadia and zirconia metal oxides.

3. The method of claim 1 wherein the ionic liquid functionalized coupling agent material comprises an ionic liquid functionalized alkoxysilane.

4. The method of claim 1 wherein the preparing uses an alkoxide condensation reaction.

5. The method of claim 1 wherein the preparing uses a metal halide hydrolysis reaction.

6. A material composition comprising:
a plurality of nanoparticles; and
a plurality of ionic liquid molecules each comprising:
at least one of a nitrogen cation moiety, a phosphorus cation moiety and a sulfur cation moiety; and
a counter anion, each nitrogen cation moiety, phosphorus cation moiety or sulfur cation moiety being tethered to only a single nanoparticle.

7. The material composition of claim 6 further comprising a host material that is not tethered to any of the plurality of nanoparticles.

8. The material composition of claim 7 wherein the host material comprises a plurality of additional ionic liquid molecules.

9. The material composition of claim 7 wherein the host material comprises at least one material selected from the group consisting of:
solvents selected from the group consisting of carbonates, ethers, acetamides, acetontrile, symmetric sulfones, 1,3-dioxolanes, glymes, siloxanes and blends of the foregoing solvents; and
polymers selected from the group consisting of polyethylene oxides, polypropylene oxides, polyacrylonitriles, polysiloxanes, polyimides, polyethers, sulfonated polyimides, perfluorinated polymers and blends of the foregoing polymers.

10. The material composition of claim 6 wherein each of the plurality of nanoparticles has a diameter from about 2 to about 1000 nanometers.

11. The material composition of claim 6 wherein the plurality of nanoparticles comprises a metal oxide material selected from the group consisting of silica, alumina, ceria, titania, vanadia and zirconia metal oxide materials.

12. The material composition of claim 6 wherein the nitrogen cation moiety is selected from the group consisting of imidazolium, ammonium, pyridinium, piperdinium, and pyrrolidinium nitrogen cation moieties.

13. The material composition of claim 6 wherein the counter anion is selected from the group consisting of tetrafluoroborate, hexafluorophosphate, bis(trifluoromethylsulfonyl)imide, trifluoromethane sulfonate, trifluoroacetate, acetate, nitrate, chloride, bromide, iodide, bis(pentafluoroethylsulfonyl)imide, dicyanamide, hexafluoroantimonate, hexafluoroarsenate and tetrachloroaluminate counter anions.

14. The material composition of claim 6 wherein the at least one of the nitrogen cation moiety, the phosphorus cation moiety and the sulfur cation moiety is covalently tethered to the single nanoparticle.

15. A material composition comprising:
a plurality of nanoparticles;
a plurality of ionic liquid molecules each comprising:
at least one of a nitrogen cation moiety, a phosphorus cation moiety and a sulfur cation moiety; and
a counter anion; and
a lithium salt, where each nitrogen cation moiety, phosphorus cation moiety or sulfur cation moiety is tethered to only one nanoparticle.

16. The material composition of claim 15 further comprising a host material that is not tethered to any of the plurality of nanoparticles.

17. The material composition of claim 16 wherein the host material comprises a plurality of additional ionic liquid molecules.

18. The material composition of claim 16 wherein the host material comprises at least one material selected from the group consisting of:
solvents selected from the group consisting of carbonates, ethers, acetamides, acetontrile, symmetric sulfones, 1,3-dioxolanes, glymes, siloxanes and blends of the foregoing solvents; and
polymers selected from the group consisting of polyethylene oxides, polypropylene oxides, polyacrylonitriles, polysiloxanes, polyimides, polyethers, sulfonated polyimides, perfluorinated polymers and blends of the foregoing polymers.

19. The material composition of claim 15 wherein each of the plurality of nanoparticles has a diameter from about 2 to about 1000 nanometers.

20. The material composition of claim 15 wherein the plurality of nanoparticles comprises a metal oxide material selected from the group consisting of silica, alumina, ceria, titania, vanadia and zirconia metal oxide materials.

21. The material composition of claim 15 wherein the nitrogen cation moiety is selected from the group consisting of imidazolium, ammonium, pyridinium, piperdinium, and pyrrolidinium nitrogen cation moieties.

22. The material composition of claim 15 wherein the counter anion is selected from the group consisting of tetrafluoroborate, hexafluorophosphate, bis(trifluoromethylsulfonyl)imide, trifluoromethane sulfonate, trifluoroacetate, acetate, nitrate, chloride, bromide, iodide, bis(pentafluoroethylsulfonyl)imide, dicynamide, hexafluoroarsenate, hexafluoroantimonate and tetrachloroaluminate counter ions.

23. The material composition of claim 15 wherein the at least one of the nitrogen cation moiety, the phosphorus cation moiety and the sulfur cation moiety is tethered to a single nanoparticle.

24. The material composition of claim 15 wherein the lithium salt includes at least one of lithium tetrafluoroborate, lithium hexafluorophosphate, lithium bis(trifluoromethylsulfonyl)imide, lithium trifluoromethane sulfonate, lithium trifluoroacetate, lithium acetate, lithium nitrate, lithium perchlorate, lithium hexafluoroarsinate, lithium bis(pentafluoroethylsulfonyl)imide, lithium dicynamide, lithium tetrachloroaluminate and lithium hexafluoroantimonate lithium salts.

25. A battery comprising an electrolyte comprising a material composition comprising:
a plurality of nanoparticles; and
a plurality of ionic liquid molecules each comprising:
at least one of a nitrogen cation moiety, a phosphorus cation moiety and a sulfur cation moiety; and
a counter anion, each nitrogen cation moiety, phosphorus cation moiety or sulfur cation moiety being tethered to only one nanoparticle.

26. The battery of claim 25 further comprising a host material that is not tethered to any of the plurality of nanoparticles.

27. The battery of claim 26 wherein the host material comprises a plurality of additional ionic liquid molecules.

28. The material composition of claim 26 wherein the host material comprises at least one material selected from the groups consisting of:
solvents selected from the group consisting of carbonates, ethers, acetamides, acetontrile, symmetric sulfones, 1,3-dioxolanes, glymes, siloxanes and blends of the foregoing solvents; and
polymers selected from the group consisting of polyethylene oxides, polypropylene oxides, polyacrylonitriles, polysiloxanes, polyimides, polyethers, sulfonated polyimides, perfluorinated polymers and blends of the foregoing polymers.

29. The battery of claim 25 wherein each of the plurality of nanoparticles has a diameter from about 2 to about 100 nanometers.

30. The battery of claim 25 wherein the plurality of nanoparticles comprises an oxide material selected from the group consisting of silica, alumina, ceria, titania, vanadia and zirconia metal oxide materials.

31. The battery of claim 25 wherein the nitrogen cation moiety is selected from the group consisting of imidazolium, ammonium, pyridinium, piperdinium, and pyrrolidinium nitrogen cation moieties.

32. The battery of claim 25 wherein the counter anion is selected from the group consisting of tetrafluoroborate, hexafluorophosphate, bis(trifluoromethylsulfonyl)imide, trifluoromethane sulfonate, trifluoroacetate, acetate, nitrate, chloride, bromide, iodide, bis(pentafluoroethylsulfonyl)imide, dicynamide, hexafluoroarsenate, hexafluoroantimonate and tetrachloroaluminate counter anions.

33. The battery of claim 25 wherein the at least one of the nitrogen cation moiety, the phosphorus cation moiety and the sulfur cation moiety is tethered to a single nanoparticle.

34. The composition of claim 6 wherein each nitrogen cation moiety, phosphorus cation moiety or sulfur cation moiety by being tethered to only a single nanoparticle avoids agglomeration of the nanoparticle when preparing the ionic liquid nanoscale ionic material.

\* \* \* \* \*